United States Patent
Giuliani et al.

(10) Patent No.: US 11,386,181 B2
(45) Date of Patent: Jul. 12, 2022

(54) DETECTING A CHANGE TO THE CONTENT OF INFORMATION DISPLAYED TO A USER OF A WEBSITE

(71) Applicant: Webroot Inc., Broomfield, CO (US)

(72) Inventors: Marco Giuliani, Bastia Umbra (IT); Davide Tortoioli, San Biagio della Valle-Marsciano (IT); Riccardo Vandoni, Perugia (IT); Jacques Etienne Erasmus, Derby (GB)

(73) Assignee: WEBROOT, INC., Broomfield, CO (US)

(*) Notice: Subject to any disclaimer, the term of this patent is extended or adjusted under 35 U.S.C. 154(b) by 329 days.

(21) Appl. No.: 14/214,935

(22) Filed: Mar. 15, 2014

(65) Prior Publication Data

US 2014/0281919 A1    Sep. 18, 2014

Related U.S. Application Data

(60) Provisional application No. 61/802,348, filed on Mar. 15, 2013.

(51) Int. Cl.
*G06F 16/00* (2019.01)
*G06F 16/957* (2019.01)

(52) U.S. Cl.
CPC ................... *G06F 16/957* (2019.01)

(58) Field of Classification Search
CPC ..... H04L 63/1483; H04L 9/32; H04L 9/3223; G06F 17/2247; G06F 16/957
See application file for complete search history.

(56) References Cited

U.S. PATENT DOCUMENTS

| | | | | |
|---|---|---|---|---|
| 5,889,774 A * | 3/1999 | Mirashrafi | .......... | H04M 7/1225 370/352 |
| 5,974,481 A * | 10/1999 | Broder | ....................... | G06F 7/02 712/E9.02 |
| 7,480,910 B1 * | 1/2009 | Kuwamoto | ........... | G06F 40/166 718/102 |
| 7,788,576 B1 * | 8/2010 | Chen | .................... | G06Q 10/107 715/752 |
| 7,958,555 B1 * | 6/2011 | Chen | ................... | H04L 63/1441 726/25 |
| 8,086,953 B1 * | 12/2011 | Gabber | ................. | G06F 16/957 707/711 |
| 8,103,875 B1 * | 1/2012 | Ramzan | .................. | H04L 51/12 713/180 |
| 8,205,255 B2 * | 6/2012 | Benea | ................. | H04L 63/0876 726/25 |
| 8,255,280 B1 * | 8/2012 | Kay | ......................... | G06F 16/95 705/26.1 |
| 8,381,292 B1 * | 2/2013 | Warner | ................. | H04L 12/585 705/50 |

(Continued)

*Primary Examiner* — Cesar B Paula
*Assistant Examiner* — David Faber
(74) *Attorney, Agent, or Firm* — Sprinkle IP Law Group (57) ABSTRACT

Methods and systems are provided for detecting a change in web content of a web page. In particular, executable instructions may be inserted into a web page such that a first fingerprint of the web page is created when viewed on a client device. The first fingerprint may then be compared to a previously created fingerprint to determine if the web page has been modified. The fingerprints may be based on one or more elements of the web page.

20 Claims, 7 Drawing Sheets

(56) References Cited

U.S. PATENT DOCUMENTS

| | | | | |
|---|---|---|---|---|
| 8,521,735 | B1* | 8/2013 | Mourad | G06F 21/6254 |
| | | | | 707/732 |
| 9,436,763 | B1* | 9/2016 | Gianos | G06F 16/951 |
| 2003/0200175 | A1* | 10/2003 | Wang | G06Q 20/10 |
| | | | | 705/50 |
| 2004/0003248 | A1* | 1/2004 | Arkhipov | H04L 9/3247 |
| | | | | 713/170 |
| 2007/0067304 | A1* | 3/2007 | Ives | G06F 16/951 |
| 2007/0094500 | A1* | 4/2007 | Shannon | G06F 21/645 |
| | | | | 713/170 |
| 2007/0130327 | A1* | 6/2007 | Kuo | G06F 16/958 |
| | | | | 709/224 |
| 2007/0234409 | A1* | 10/2007 | Eisen | H04L 63/0876 |
| | | | | 726/6 |
| 2008/0172741 | A1* | 7/2008 | Reumann | H04L 63/1483 |
| | | | | 726/23 |
| 2008/0307301 | A1* | 12/2008 | Decker | G06F 16/9577 |
| | | | | 715/241 |
| 2009/0064337 | A1* | 3/2009 | Chien | G06F 21/564 |
| | | | | 726/25 |
| 2011/0145435 | A1* | 6/2011 | Bhatawdekar | G06F 21/566 |
| | | | | 709/238 |
| 2011/0296509 | A1* | 12/2011 | Todorov | G06F 21/36 |
| | | | | 726/7 |
| 2013/0332523 | A1* | 12/2013 | Luu | G06Q 30/0251 |
| | | | | 709/204 |
| 2014/0019262 | A1* | 1/2014 | Reitsma | G06Q 30/0241 |
| | | | | 709/217 |

* cited by examiner

DETECTING A CHANGE TO THE CONTENT OF INFORMATION DISPLAYED TO A USER OF A WEBSITE

CROSS REFERENCE TO RELATED APPLICATION

The present application claims the benefits of and priority from U.S. Provisional Application Ser. No. 61/802,348 filed Mar. 15, 2013, the entire disclosure of which is hereby incorporated by reference in its entirety for all that it teaches and for all purposes.

FIELD OF THE INVENTION

The present invention relates generally to the field of computer security. More specifically, the present invention relates to detecting a change to the content of information that is displayed to a user of a website.

BACKGROUND

Malicious software can wreak havoc on computer and information systems that are unfortunate enough to become the latest malware or pestware victim. As anti-malware software and anti-malware detection techniques become increasingly effective at combating the onslaught of malware or pestware infections, unfortunately, some malware still manages to make its way onto the computers of unsuspecting users. Even worse, as more and more service providers are utilizing the internet and making use of various web architectures to provide or allow access to an expanding profile of services, service providers have no effective techniques to ensure that the services they offer are being accessed and utilized by uninfected computer systems. Moreover, providing services that make use of sensitive information such as online banking information, personal health records, and even social media, can be fraught with danger should the sensitive information fall into the wrong hands. Many users of computer systems willingly provide sensitive information to reputable and frequently accessed service provider's websites without thinking twice, making them prime targets to phishing scams and fraudulent websites.

Phishing tends to be defined as the act of attempting to acquire information such as usernames, passwords, and credit card details by masquerading as a trustworthy entity in an electronic communication. Common types of phishing include forged or fraudulent websites, deceitful emails, and falsified instant messages. In general, an unsuspecting user is tricked into believing that the communication they are having is with a trusted entity and an entity authorized to collect their sensitive information. Although encryption techniques exist to reduce the likelihood of man-in-the-middle attacks, a solution that protects unsuspecting users from entering information into reputable websites that have been compromised in one way or another has yet to be implemented; that is, there is no solution that exists which ensures that the website a user is visiting is the website the service provider intended them to see.

SUMMARY

Accordingly, there exists a need to ensure that a web page a user is viewing is the web page that a service provider intended them to see. It is thus one aspect of the present invention to provide a method that generally comprises detecting a change in content of a web page. This method may further comprise creating a server-side fingerprint based on one or more elements of the web page, injecting executable instructions into the web page such that upon execution at a client device, the executable instructions create a client-side fingerprint of a web page containing the executable instructions based on the one or more elements, receiving the client-side fingerprint, and comparing the client-side fingerprint to the server-side fingerprint.

Since such a solution may be applied to web pages, or web sites, already in place, embodiments of the present invention may provide a method that may protect existing websites; the method generally comprises generating a first fingerprint of a web page, wherein the first fingerprint is based on one or more elements of a first instance of the web page, receiving a second instance of a web page, injecting executable instructions into the received second instance of the web page such that upon execution at a client device, the executable instructions create a second fingerprint of the web page, wherein the second fingerprint is based on the one or more elements of the web page, and comparing the first fingerprint to the second fingerprint.

It is another aspect of the present invention to provide a system for detecting a change in web content, the system comprising a code injection module, a server device including a processor, a communication interface, data storage, and a server application stored on the data storage that is executable by the processor, wherein the server application is operable to create a server-side fingerprint based on one or more elements of a web page and provide the web page, utilizing the communication interface, to a code injection module, wherein the code injection module injects executable instructions into the web page such that upon execution at a client device, the executable instructions create a client-side fingerprint of a web page containing the executable instructions based on the one or more elements, wherein the server application is further operable to receive the client-side fingerprint and compare the client-side fingerprint to the server-side fingerprint.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, magnetic or optical disks. Volatile media includes dynamic memory, such as main memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

As will become apparent in view of the following disclosure, the various aspects and embodiments of the invention can be combined.

DETAILED DESCRIPTION

Figure 1:
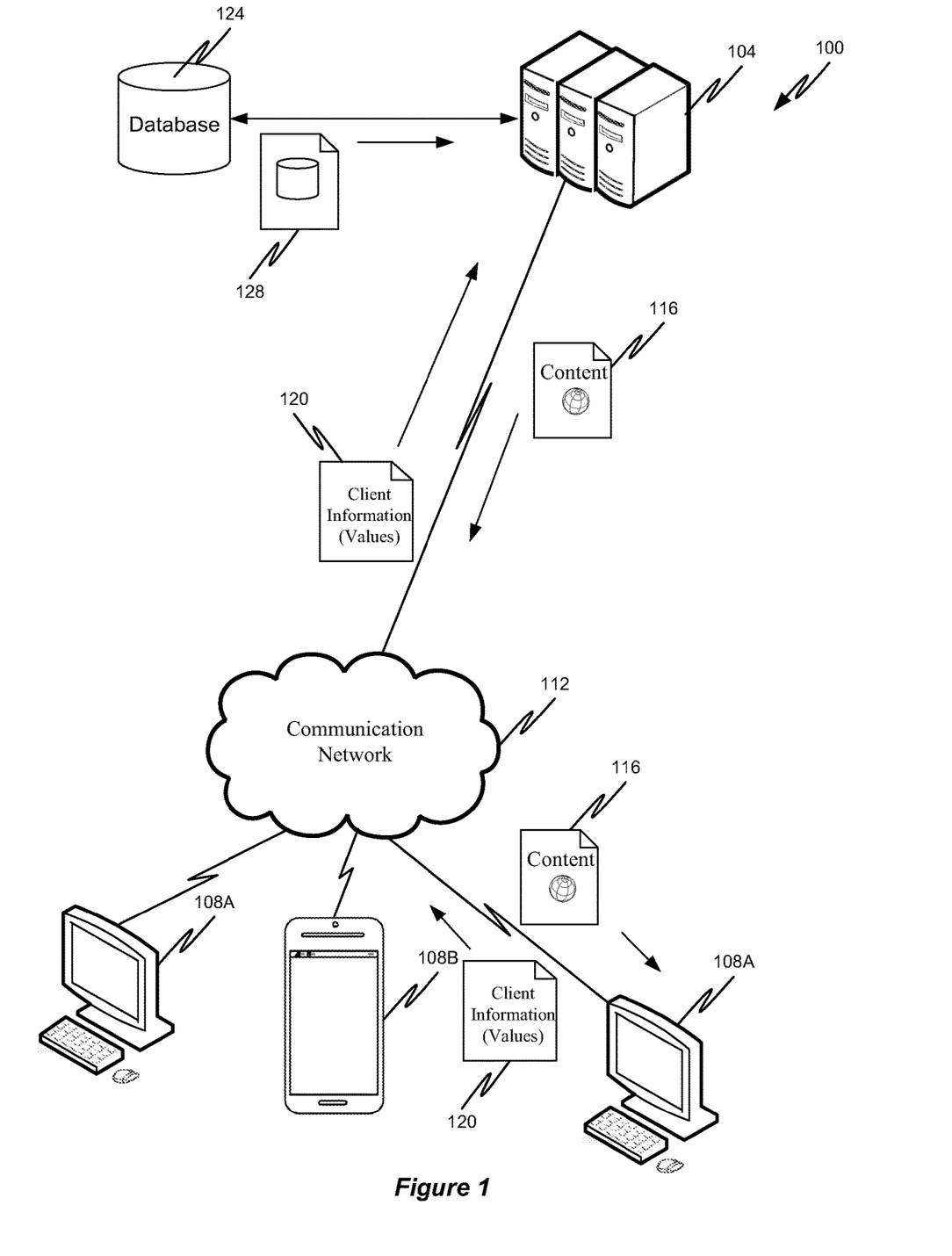
FIG. 1 illustrates an example of a computer system communicating with a service provider server in accordance with embodiments of the present invention.

Referring to FIG. 1, a computer network 100 is generally shown as being based around a distributed network such as a communication network 112. Communication network 112 may comprise any type of known communication medium or collection of communication media and may use any type of protocols to transport messages between endpoints. The communication network 112 may include wired and/or wireless communication technologies. The Internet is an example of the communication network 112 that constitutes an Internet Protocol (IP) network consisting of many computers, computing networks, and other communication devices located all over the world, which are connected through many telephone systems and other means. Other examples of the communication network 112 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 112 need not be limited to any one network type, and instead may be comprised of a number of different networks and/or network types.

Figure 2:
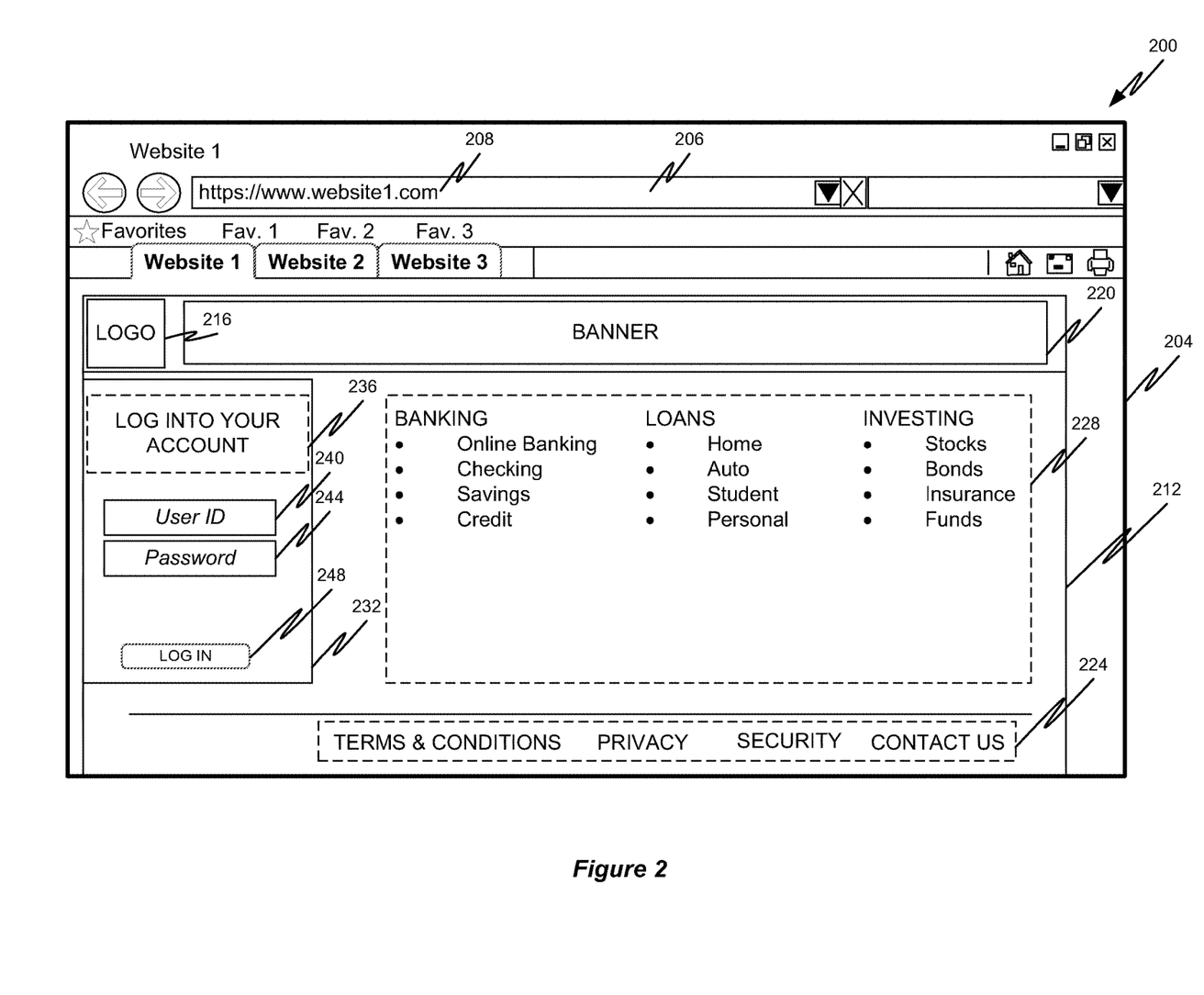
FIG. 2 depicts a first web page in accordance with embodiments of the present invention.

One or more local computer systems 108 may be connected via the communication network 112 to one or more central servers 104 capable of providing or serving content to a computer system 108 over the communication medium 112. For example, all or portions of a particular website, "Website 1", as illustrated in FIG. 2, may be hosted by server 104. Each computer system 108 may comprises a personal computer 108A, 108C, a server of any type, a PDA, mobile device 108B such as a mobile phone, an interactive television, or any other device capable of loading and operating computer objects. The computer system 108 may also be considered a client computer system; such a client computer system is generally located within a distributed network environment where one or more computer systems 108 relies on a service, product, or application that resides in a network environment that is not local to the computer systems 108. As a client computer system, computer system 108 might access services, products, or applications residing on server 104 via communication network 112.

As an example of an implementation of computer network 100 in accordance with embodiments of the present disclosure, a client computer system 108 may make a request to view a website, wherein one or more files associated with the website reside on server 104. Server 104 generally responds to the request of the computer system 108 and sends varying content 116 to the computer system 108. The content 116 sent from server 104 to computer system 108 may be referred to as web content; though other forms of content are contemplated. The computer system 108 may interact with the content and may further submit or send additional content, or client information 120, to the server 104. In the context of websites for example, if a user is utilizing computer system 108 to login to a website hosted or located at server 104, the computer system 108 may send or submit a user id associated with the user and a password associated with the user id. In such an instance, the client information 120 comprising the user id and the password may be sent to the server 104, as illustrated generally in FIG. 1. As another example, a user may enter "UserABC" as their user id and "PasswordABC" as their password. "UserABC" and "PasswordABC" are sent to the server 104 as client information 120. Of course, the user id and password may be encrypted prior to sending.

Referring to FIG. 2, an example web browser and web page 200 is illustrated. Web browser 204 may be any web browser capable of retrieving and displaying information resources that reside on the world wide web, public network, and/or private network. Example web browsers 204 include, but are not limited to Internet Explorer, Chrome, Firefox, Opera, and Safari. Web browser 204 generally includes an address bar 206 that displays a particular Uniform Resource Locator (URL) 208 in which a web browser 204 is currently accessing or the web browser 204 has been directed to. A URL may refer to an address of a remote server that provides access to one or more resources, such as, but not limited to web pages, websites, documents, and discussion forums. Alternatively, or in addition, a URL may refer to a local resource located on a local computer system and/or local computer network.

The web browser 204 may display one or more web pages 212 to a user. A web page 212 is generally a web document or other resource that is accessible through a web browser and displayed on a monitor or mobile device 108. The web page 212 may be rendered, or displayed, within the borders of the web browser 204, or may be displayed as a separate application or resource. For example, it is not uncommon for a web page to launch a pop-up window that displays additional information, such as audio, video, and/or another web page, in a separate window, tab, or web browser.

The web page 212 may be rendered according to a document object model (DOM) associated with the web page. The DOM may include one or more nodes that correspond to one or more elements appearing in the web page. For example, web page 212, as shown, is generally illustrative of a banking website requiring the submission of sensitive information in order to gain access to services, such as banking services, provided by a banking institution. The example web page 212 may include elements such as, but not limited to one or more logos 216, a banner or banners 220, 224, one or more content areas 228, and one or more login areas 232. The login area 232 generally includes one or more fields or forms 240, 244 and a "submit" and/or "log in" button 248. A login area 232 may include a content area 236; the content area 236 may include instructions that a user is to follow to gain access to services provided by the banking institution. Alternatively, or in addition, content area 236 may include content generally representative of the login area 232. For example, content area 236 may provide an indication to a user that certain locations within content area 236 are locations in which a user id and password are to be entered. For instance, a user would enter a user id in field 240 and a password in field 244. After entering these two items, a user would click on the "log in" button 248 to be logged into the banking website. Once logged in, the user may have access to various services and offerings provided by the banking institution. Each element, as described above, may have one or more DOM nodes associated therewith.

The web page 212 may be created, or coded, using various mark-up and/or programming languages such as, but not limited to HTML, XML, JAVASCRIPT, AJAX, ASP, PHP, Perl, Python, .NET, Java, and jQuery. In general, a web page, such as web page 212, resides on a server 104 capable of serving web content, such as a web content 116. More specifically, a web page 212 may include programming code that causes web content and/or functions to be transferred and displayed to a user at a client or computer system. Upon a user navigating the web browser 204 to a particular web page or resource residing at or on a web server 104 for example, content 116, 228 related to the web page 212 may be transmitted to the web browser 204 for rendering and display in the web page 212. That is, a web page may comprise a document that can incorporate text, graphics, sounds, etc. and is generally a hypertext document, or file, on the World Wide Web, but is not limited to this location. The content of the web page, or file, may therefore include text, graphics, sounds, etc. and also markup symbols or codes inserted in the content, or file, intended for display on a World Wide Web browser page. Additionally, executable instructions, such as scripts, codes, and the like may be utilized within the content to make actions, functions, and or interactions possible.

Various mark-up and programming languages make actions, functions, and/or interactions of the web page possible. For example, some programming languages execute programming code on the web server in which they reside; such programming languages are often referred to as server side coding languages or server side scripting languages. An example of a server side language is PHP. Other programming languages are designed to execute on the client computer system 108, such as within the web browser 204, the client computer system 108, and/or computing device 104; these programming languages are often referred to as client side coding languages or client side scripting. An example of a client side scripting language is JavaScript. Depending on requirements, a web page 212 may be coded in multiple programming languages, such that coded portions of a web page 212 are executed at a web server 104 while other coded portions of a web page are executed on the client computer system 108. As one example, a web page may comprise one or more HTML elements, attributes for the one or more HTML elements, one or more tags, and/or one or more scripts to be executed by the client computer system 108.

As another example, referring to FIG. 1, the content displayed in content area 228 may reside in a database 124 referenced by the web page 212 and accessible to a web server 104 on which web page 212 resides. The coded web page may execute a portion of the coded programming language to retrieve the content 128 to be displayed in content area 228. The web server 104 may then format the retrieved content 128 and transmit the newly assembled web content 116 to the client computer system 108 for rendering and display. Once the web page 212 has been displayed, a user may enter a user id into field 240, a password into field 244, and click on the button 248. Upon clicking on the button 248, client side executable code may execute, causing the user id and password to be encrypted and sent to the server 104. Using the user id and password, the server 104 may then log the user into the website.

In some situations, the client computer system 108 may become infected with malware; that is, one or more pieces of malware may have been installed on the client computer system 108 rendering the client computer system 108 compromised. The term "malware" is used herein to refer generally to any executable computer file or, more generally "object", that is itself or contains malicious code, and thus includes viruses, Trojans, worms, spyware, adware, etc. and the like. Malware is generally designed to wreak havoc on computer systems by disrupting operations, gathering sensitive information, and/or providing access to the compromised computer system. When gathering sensitive information, variants of malware may target a specific set or class of websites known to accept or require various amounts of sensitive data from a user. For example, some variants of malware will alter content, i.e. web content, that is displayed to a user such that the displayed web page phishes for additional sensitive information; that is, the user, believing the website is legitimate, may enter such sensitive information into one or more fields of a website. As an example, web page 212—as a banking website—allows a user to access services from a banking services provider utilizing a client computer system 108. As previously discussed and as illustrated in FIG. 2, a user may be required to provide a username and a password to gain access to the services offered by the baking services provider. If the computer system 108 becomes infected with specific variants of malware that gathers sensitive information, the malware variant, running on the local client computer system 108, may alter a web page 212 that is displayed to a user. Stated another way, the malware may modify the website code in such a manner as to cause the web page that is displayed to the user to be different from the web page in which the services provider intended the user to view.

Figure 3:
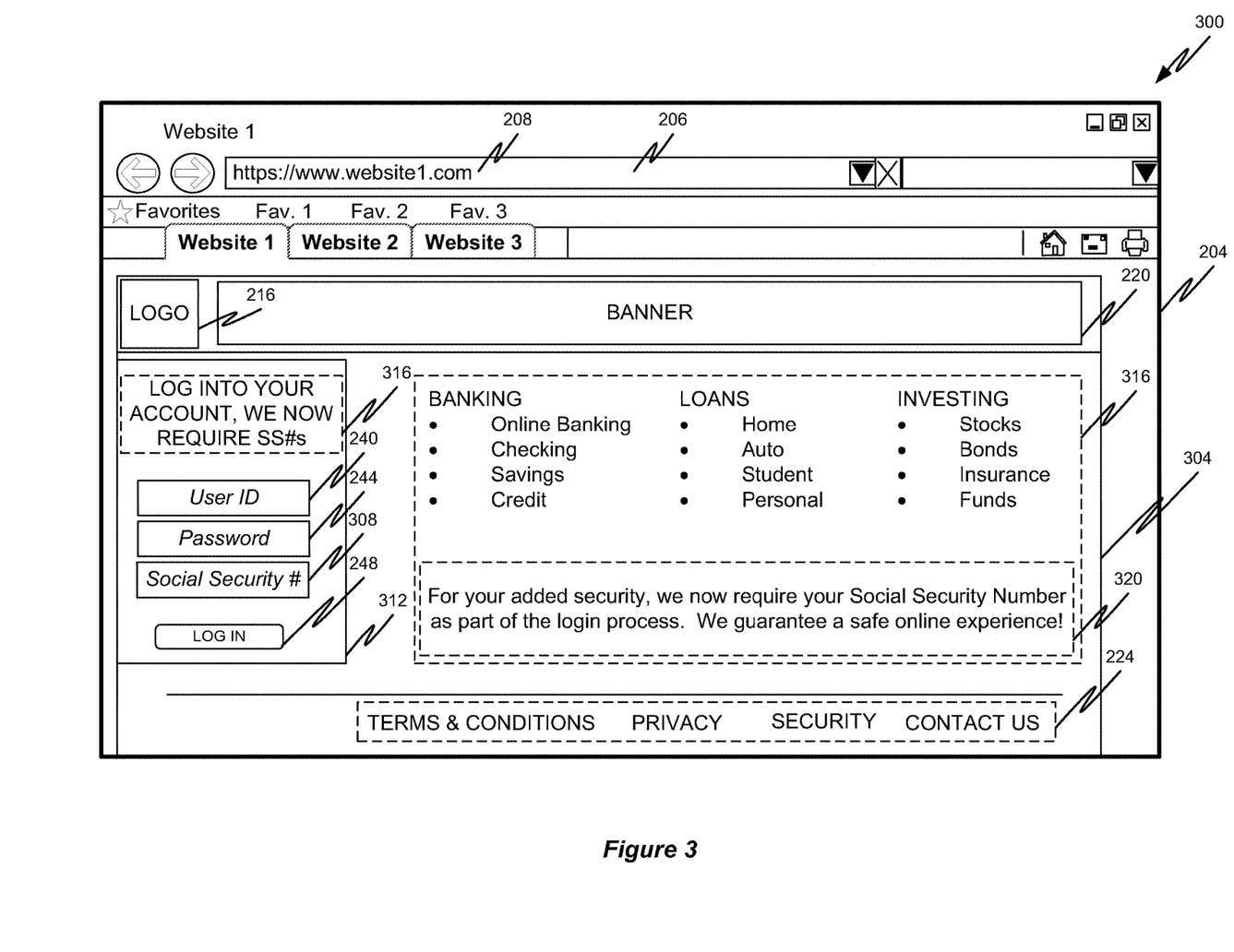
FIG. 3 depicts a compromised web page in accordance with embodiments of the present invention.

As an example, FIG. 3 generally illustrates a web browser and web page 300 that is displayed as a result of the computer system 108 having been infected with one or more pieces of malware. In particular, web page 312, corresponding to the uninfected computer system 108 displaying web page 212, has been altered such that additional content is displayed to a user. Specifically, a malware variant has caused field 308 to be added and the information in content areas 312 and 316 to be modified. A particular malware variant may alter the web page 312 using a variety of different methods. For example, the malware variant may intercept and modify the web content 116 as the content 116 is being received and/or rendered via the web browser. As a simple example, table 1 includes example PHP programming code describing a common form object that includes a userid and password field as shown in login area 232. Specifically, when the user clicks "log in", 248, a web page—Login.php may make use of and access the data entered into the userid and password fields. For example, the userid and the password may be compared to a list of userids and associated passwords that are authorized to access a particular website or login. Of course, depending on various security models, the userid and/or the password may be encrypted prior to being made available to the Login.php web page.

TABLE 1

```
<form action="Login.php" method="post">
<h3>SIGN IN TO YOUR ACCOUNT</h3>
<form action="Login.php" method="post">
<input type="text" name="userid" value="User ID"><br>
<input type="text" name="password" value="Password"><br>
<br>
<input type="submit" value="LOG IN">
</form>
```

Table 2 includes example PHP programming code describing a common form object of 232 that has been compromised by one or more pieces of malware. Specifically, the one or malware variants have altered the login content area 232 of FIG. 2 such that an additional element or field, Social Security #308, is displayed to the user, as shown in the login area 312 of FIG. 3. If a user clicks "log in", 248, a web page—Login.php can make use of and access the data entered into the userid 240, password 244, and now, social security #308 fields.

TABLE 2

```
<form action="Login.php" method="post">
<h3>LOG IN TO YOUR ACCOUNT, WE NOW REQUIRE SS#s</h3>
<form action="Login.php" method="post">
<input type="text" name="userid" value="User ID"><br>
<input type="text" name="password" value="Password"><br>
<input type="text" name="social_security" value="Social Security #"><br>
<br>
<input type="submit" value="LOG IN">
</form>
```

Moreover, the malware variant may have caused additional alterations to the web page 212. For example, web page 304 now includes additional, or altered, content located in content area 312. Content area 312 includes a content area 308 that may display a comforting or reaffirming message to a user; a message such as "For your added security, we now require your Social Security number as part of the login process. We guarantee a safe online experience!" may lead an unsuspecting user to believe that the additional social security information requested by the web page 312 is a legitimate request. Moreover, a content area 336 may state "LOG IN TO YOUR ACCOUNT, WE NOW REQUIRE SS#s". Again, such an alteration in content may cause an unsuspecting user to believe that the additional social security information requested by the web page 312 is a legitimate request. The user may then enter additional information, such as their social security information, and click submit. A malware variant may then receive this additional information and forward it on to a person having malicious intent.

Once a user has entered this additional information, a malware variant may obtain this entered additional information in a variety of ways. For example, the malware variant may log keystrokes associated with the particular field, take a screenshot of the web page upon the user clicking submit, and/or may cause the information entered into the fields to be "posted", using post or get methods, to a web page other than the web page defined in the form. For example, the form of Table 1 utilizes the "post" method to send the information entered into the form fields, i.e. userid, password, to the web page "Login.php". A malware variant may cause the information entered into the form fields, i.e. userid, password, social security number, to be sent to a different web page, such as "MalwareLogin.php". Additional methods in which the malware variant may cause the information entered into the form fields to be sent to a different web page are contemplated.

Figure 4:
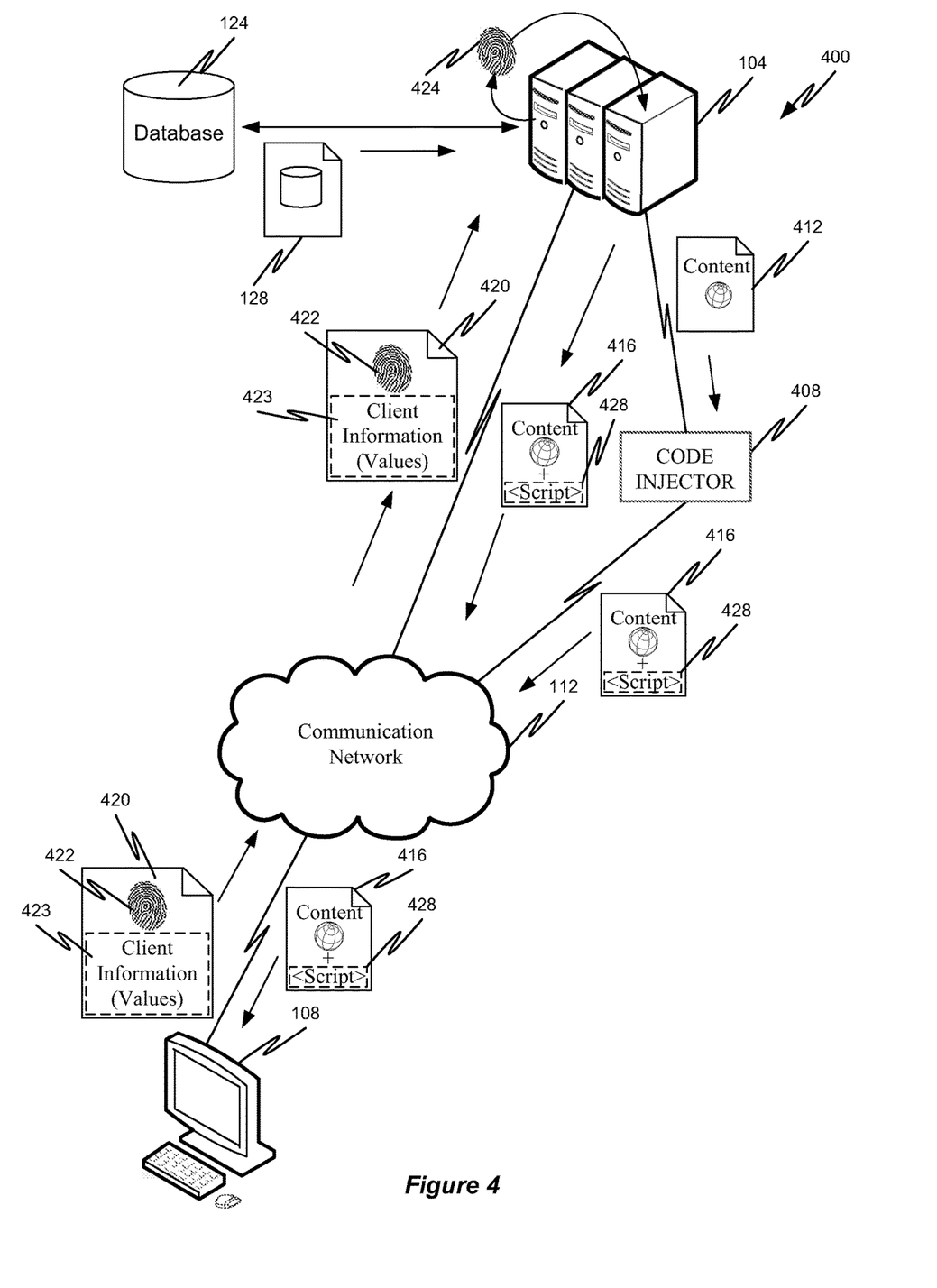
FIG. 4 illustrates detailed view of a computer system, service provider information system, and injection device, in accordance with embodiments of the present invention.

FIG. 4 illustrates an example of an implementation of computer network 400 in accordance with embodiments of the present disclosure; embodiments of the present disclosure reduce the likelihood of an altered web page being displayed or rendered to a user without a user knowing that the displayed web page has been modified. Thus, if a web page, such as web page 212, is altered by one or more malware variants, a user and/or a service provider may be alerted or notified to the existence of this altered web page. Such a notification may prevent a user from unintentionally providing sensitive information to a malware variant.

Embodiments of the present disclosure utilize digital fingerprints to essentially "lockdown" a web page, such that any change or modification that occurs to a web page between the time a web page is accessed on a server and presented to a user is detected. For example, a digital fingerprint of a web page, or web content that is to be presented to a user, is created at a server controlled by a service provider. This digital fingerprint is then stored at the server for later use. For instance, a service provider, such as a banking institution, may create one or more websites having one or more web pages that have been made accessible to clients or customers. The service provider may choose to create a digital fingerprint of a web page, a website, and/or resources, such as documents, that are made available to users. For example, the service provider may create a digital fingerprint of web pages in which sensitive information is received, such as a login screen webpage. This digital fingerprint is stored as a server-side fingerprint for later retrieval.

Moreover, the service provider may cause a client-side executable code, such as script, to be inserted into the web content and/or web page code, associated with the web page to be fingerprinted. The inserted client-side executable code, once received at a client computer system, creates a client-side fingerprint of the web page rendered and/or presented to a user. The client-side fingerprint is then sent to the server so that the client-side fingerprint and the server-side fingerprint can be compared. If there exist any discrepancies between the client-side fingerprint and the server-side fingerprint, the user and/or the service provider may be alerted and/or notified. Additionally, other protective measures, such as page redirection, may occur if the two fingerprints do not match.

Turning again to FIG. 4, plural local or computer systems 108 may be connected via the communication network 112 to a "central server" or one or more servers 104 capable of providing or serving, or providing, content to the computer system 108 via the communication medium 112. For instance, a particular website, "Website 1", may be hosted by server 104. The computer system 108 may make a request to view the website, wherein one or more files of the website reside on server 104. Server 104 generally responds to the request of the computer system 108 and sends varying content 412 to the computer system 108. Generally speaking, the content 412 sent from server 104 to computer system 108 may be referred to as web content and/or web page code; though, as previously mentioned, other forms of content are contemplated. Prior to being delivered to the computer system 108, the content 412 sent from the server 104 is intercepted at a code injector 408. The code injector 408 may be any device or module that provides a capability to manipulate and manage internet protocol traffic. For example, code injector 408 may intercept, inspect, and/or transform the inbound and outbound internet protocol traffic. One example of a code injector may be a device utilizing one or more iRules that intercept, inspect, and transform inbound or outbound traffic to inject a script 428, such as a JavaScript, into the content 412. As will be discussed later, the script 428, or client-side executing code that is injected or added into the content 412, may cause a digital fingerprint 422 of a web page rendered or displayed at the computer system 108 to be created. Once a script 428 has been added to the content 412, the content 412 and script 428, now referenced as content and script 416, may be delivered to the computer system 108 via the communication network 112 as content and script. Although FIG. 4 depicts the code injector 408 communicating directly with the server 104, those skilled in the art can appreciate that any method of communication is possible; that is, code injector 408 is generally a network enabled device that may communicate with server 104 via a communication network, such as communication network 112.

Figure 5:
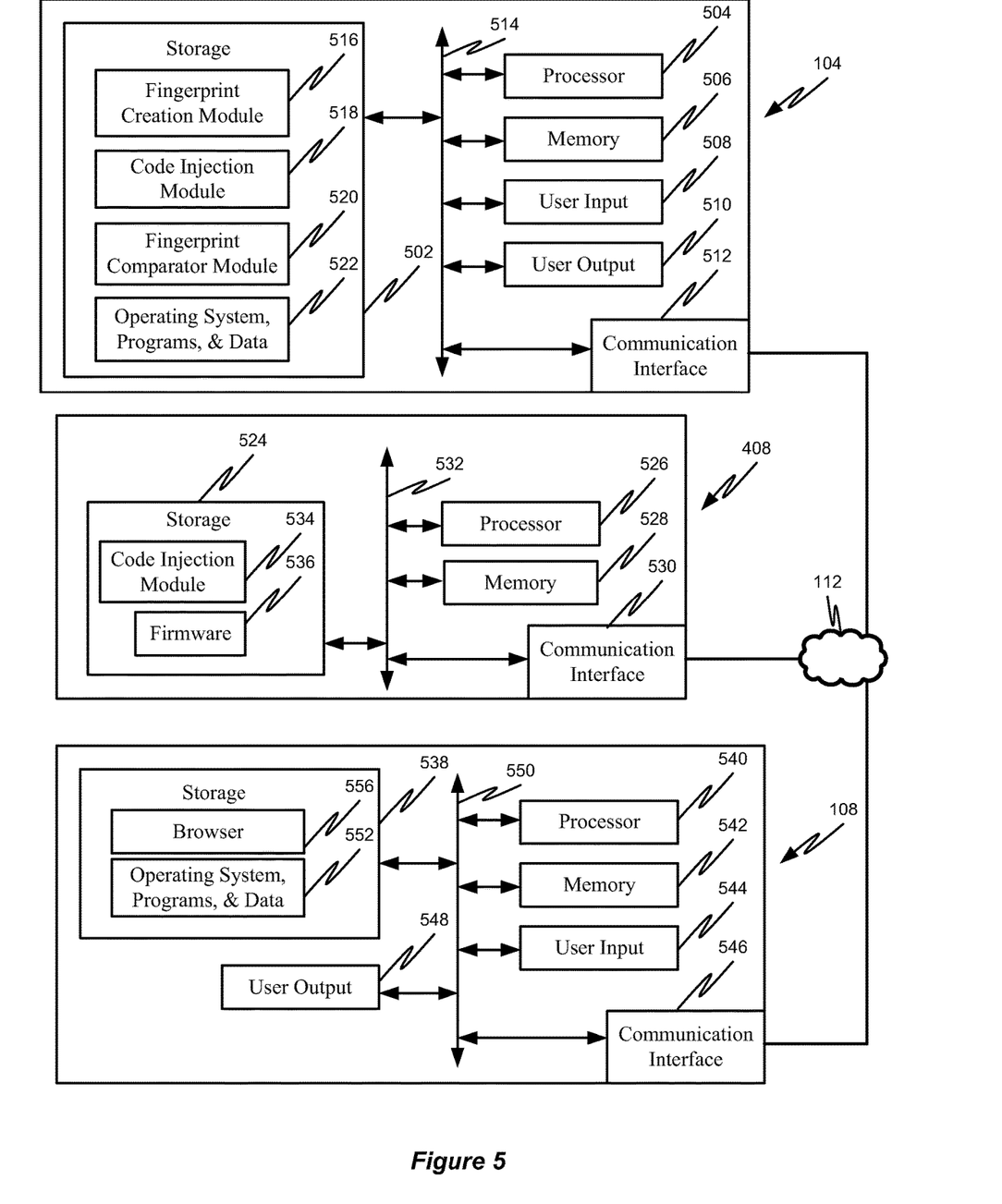
FIG. 5 depicts details of a computer system, server, and code injector in accordance with embodiments of the present invention.

Alternatively, or in addition, the capability to inject or add a client-side script 428 to content 412 may reside within a server 104. For example, a code injection module, later shown as 518, may inject or add a client-side script 428, as previously described, to the content 412, such that the server 104 provides the content and the script 416 to the computer system 108 via the communication network 112; in some instances, a code injector 408 external to the server 104 may not be necessary; in other instances, a code injector 408 may be provided in addition to a server 104 utilizing a code injection module 518.

Content and script 416 may then be provided to the computer system 108. As previously discussed, content and script 416 may be a combination of content 412 and at least one client-side script 428 that when executed at a client, creates a digital fingerprint 422 of one or more web pages. Content 412 is generally described as being web content or web page content. Thus, web content contained in content and script 416 may be rendered and/or displayed on computer system 108. Upon rendering and/or displaying the content 412, the script 428 containing executable code may be executed on the computer system 108. Alternatively, or in addition, the executable code 428 may be executed when a user clicks a submit button, such as a "log in" button 248. The executable code 428 then executes, creating a digital fingerprint 422 of the rendered or displayed web page 412 on the computer system 108 and sends the digital fingerprint 422 to server 104, via a communication network 112. Alternatively, or in addition the contents of the client information 423, and or the number of separate values contained in the client information 423, may also be sent to the server 104. The values included in the client information 423 correspond to the data entered and/or residing in fields, such as userid 240, password 244, and/or a malware variant added field, such as socialsecurity#308. The values included in the client information 423 may be sent with the digital fingerprint 422 together as 420 and/or they may be retrieved directly from the form, such as form 232, when the form posts data to the server 104. Alternatively, or in addition, the digital fingerprint 422 and/or the values included in the client information 423 may be encrypted prior to being sent to the server 104.

Once the digital fingerprint 422 is received at the server 104, the server 104 may compare the received digital fingerprint 422 with a fingerprint 424. As previously discussed, the server 104, or a server controlled by a services provider, may create the digital fingerprint 424 based on the web page or web content 412 that is to be presented to, or requested by a user of a computer system 108. The digital fingerprint 424 may then be stored at the server 104 or elsewhere for easy access. Alternatively, or in addition, the digital fingerprint 424 may be encrypted prior to being stored at server 104.

A server 104, or a server controlled by a services provider, may create the digital fingerprint 424 once for each web page that the services provider creates that requires a user to enter sensitive information, such as login information. After the digital finger print 424 has been created, the digital fingerprint 424 may be encrypted and stored. In some embodiments, the same digital fingerprint 424 may be valid or available for a predetermined period of time. For example, the digital fingerprint 424 may last a day, a month, a year, or be static. Alternatively, or in addition, the digital fingerprint 424 may be created specifically for a particular user, location of user—such as per internet protocol address, or may be created on a per session basis. For example, each time a user at computer system 108 established a session with server 104, a new fingerprint 424 may be created. In other embodiments, the creation of the server-side fingerprint 424 may occur randomly.

Turning now to FIG. 5, details of server 104, code injector 408, and computer system 108, are depicted in accordance with at least some embodiments of the present disclosure. Server 104 may include a processor 504, memory 506, one or more user input devices 508, such as a keyboard and a pointing device, and one or more user output devices 510, such as a display, speaker, and/or printer. Alternatively, or in addition, the user input 508 and the user output 510 may be combined into one device, such as a touch screen display. Server 104 may further include, a communication interface 512 for communicating with code injector 408, computer system 108, and/or the communication network 112.

Processor 504 is provided to execute instructions contained within memory 506 and/or storage 502. As such, the functionality of the server 104 is typically stored in memory 506 and/or storage 502 in the form of instructions and carried out by the processor 504 executing such instructions. Accordingly, the processor 504 may be implemented as any suitable type of microprocessor or similar type of processing chip. One example of the processor 504 may include any general-purpose programmable processor, digital signal processor (DSP) or controller for executing application programming contained within memory 506 and/or storage 502. Alternatively, or in addition, the processor 504, memory 506, and/or storage 502, may be replaced or augmented with an application specific integrated circuit (ASIC), a programmable logic device (PLD), or a field programmable gate array (FPGA).

The memory 506 generally comprises software routines facilitating, in operation, pre-determined functionality of the server 104. The memory 506 may be implemented using various types of electronic memory generally including at least one array of non-volatile memory cells (e.g., Erasable Programmable Read Only Memory (EPROM) cells or FLASH memory cells, etc.). The memory 506 may also include at least one array of dynamic random access memory (DRAM) cells. The content of the DRAM cells may be pre-programmed and write-protected thereafter, whereas other portions of the memory may selectively be modified or erased. The memory 506 may be used for either permanent data storage and/or temporary data storage.

The data storage 502 may generally include storage for programs and data. For example, data storage 502 may provide storage for a finger print creation module 516, a code injection module 518, a fingerprint comparator module 520, and/or the general operating system and other programs and data 522. One or more components of the server 104 may communicate with one another utilizing a bus 514.

Code injector 408 may include a processor 526, memory 528, one or more communication interfaces 530 for communicating with the server 104, the computer system 108, and/or the communication network 112. In general, the code injector generally comprises one or more network appliances capable of inspecting, managing, and modifying network traffic communicating on the communication interface 530.

Processor 526 is the same or similar to processor 504; that is, processor 526 is provided to execute instructions contained within memory 528 and/or storage 524. As such, the functionality of the code injector 408 is typically stored in memory 528 and/or storage 524 in the form of instructions and carried out by the processor 526 executing such instructions. Accordingly, the processor 526 may be implemented as any suitable type of microprocessor or similar type of processing chip. One example of the processor 526 may include any general-purpose programmable processor, digital signal processor (DSP) or controller for executing application programming contained within memory 528 and/or storage 524. Alternatively, or in addition, the processor 526, memory 528, and/or storage 524, may be replaced or augmented with an application specific integrated circuit (ASIC), a programmable logic device (PLD), or a field programmable gate array (FPGA).

The memory 528 is similar or the same as memory 506; that is, memory 528 generally comprises software routines facilitating, in operation, pre-determined functionality of the code injector 408. The memory 528 may be implemented using various types of electronic memory generally including at least one array of non-volatile memory cells (e.g., Erasable Programmable Read Only Memory (EPROM) cells or FLASH memory cells, etc.). The memory 528 may also include at least one array of dynamic random access memory (DRAM) cells. The content of the DRAM cells may be pre-programmed and write-protected thereafter, whereas other portions of the memory may selectively be modified or erased. The memory 528 may be used for either permanent data storage or temporary data storage.

The data storage 524 is the same or similar to data storage 502; that is, data storage 524 may generally include storage for programs and data. For example, data storage 524 may provide storage for a code injection module 534 and the code injector 408 firmware 536. One or more components of the code injector 408 may communicate with one another utilizing a bus 532.

As previously discussed, computer system 108 may each be variously a personal computer 108A, 108C a server of any type, a PDA, mobile device 108B such as a mobile phone, an interactive television, or any other device capable of loading and operating computer objects. Computer system 108 may include one or more processors 540, memory 542, one or more user input devices 544, such as a keyboard and a pointing device, and one or more user output devices 548, such as a display, speaker, and/or printer. Alternatively, or in addition, the user input 544 and the user output 548 may be combined into one device, such as a touch screen display. Computer system 108 may further include a communication interface 546 for communicating with the code injector 408, the server 104, and/or the communication network 112.

Processor 540 is the same or similar to processor 504; that is, processor 540 is provided to execute instructions contained within memory 542 and/or storage 538. As such, the functionality of the computer system 108 is typically stored in memory 542 and/or storage 538 in the form of instructions and carried out by the processor 540 executing such instructions. Accordingly, the processor 540 may be implemented as any suitable type of microprocessor or similar type of processing chip. One example of the processor 540 may include any general-purpose programmable processor, digital signal processor (DSP) or controller for executing application programming contained within memory 542 and/or storage 538. Alternatively, or in addition, the processor 540, memory 542, and/or storage 538, may be replaced or augmented with an application specific integrated circuit (ASIC), a programmable logic device (PLD), or a field programmable gate array (FPGA).

The memory 542 is similar or the same as memory 506; that is, memory 542 generally comprises software routines facilitating, in operation, pre-determined functionality of the computer system 108. The memory 542 may be implemented using various types of electronic memory generally including at least one array of non-volatile memory cells (e.g., Erasable Programmable Read Only Memory (EPROM) cells or FLASH memory cells, etc.). The memory 542 may also include at least one array of dynamic random access memory (DRAM) cells. The content of the DRAM cells may be pre-programmed and write-protected thereafter, whereas other portions of the memory may selectively be modified or erased. The memory 542 may be used for either permanent data storage or temporary data storage.

The data storage 538 is the same or similar to data storage 502; that is, data storage 538 may generally include storage for programs and data. For example, data storage 538 may provide storage for an operating system, programs, and data 552. Storage 528 may also include browser 556. Although depicted separately, the browser 556 may render and cause web code or web content to be displayed to a user view a user output device, such as user output device 548. In general, the script 428 generally executes within browser 556, utilizing storage 538, memory 542, and processor 540. One or more components of the computer system 108 may communicate with one another utilizing a bus 550.

Figure 6:
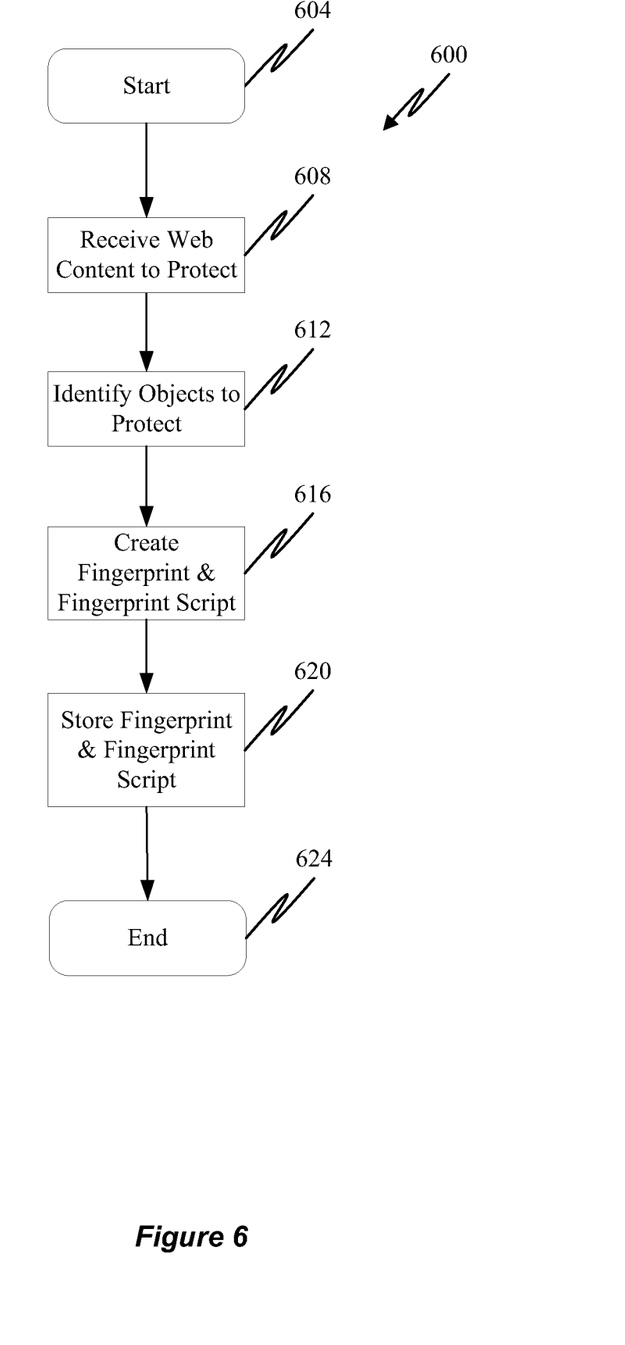
FIG. 6 depicts a flowchart showing the operation of an example of a method in accordance with embodiments of the present invention.

Referring now to FIG. 6, an exemplary flow diagram depicting the operation of an example fingerprint creation process 600 in accordance with at least some embodiments of the present disclosure is depicted. In at least some embodiments, method 600 is performed by a device, such as server 104 and/or code injector 408. In at least some embodiments, method 600 is performed by a fingerprint creation module 516. More specifically, one or more hardware or software components may be involved in performing the method 600. Method 600 can be executed as a set of computer-executable instructions executed by a computer system and encoded or stored on a computer-readable medium. Hereinafter, the method 600 shall be explained with reference to the systems, components, modules, software, data structures, etc. described in conjunction with FIGS. 1-5. More specifically, method 600 shall be explained as if executed by the Fingerprint Creation module 516. However, method 600 may be executed by hardware, software, and/or other modules previously described.

Method 600 is initiated at step 604. Method 600 may continuously flow in a loop, flow according to a timed event, or flow according to a change in an operating or status parameter. Once method 600 has started, the fingerprint creation module 516 receives the web content that is to be protected at step 608. For example, the web content may be a web page comprising various web code, such as HTML, XML, ASP, PHP, JavaScript etc. After receiving the content that is to be protected at step 608, method 600 may pass to step 612, where specific objects identified in the web content are identified for the fingerprint creation process. For example, field 240, field 244, the content within content area 228, and content area 236 may be identified as particular objects or elements that are specifically identified. Thus, if a fingerprint is created utilizing those specific elements, any change to those elements will be reflected as a different fingerprint. Moreover, changes to the web page made between such elements may be reflected as a different fingerprint.

More specifically, the objects may be identified by their corresponding location within a document object model (DOM) tree. For example, the document object model is a platform and language-neutral interface that allows programs and scripts to dynamically access and update the content, structure, and style of a document. For instance, a DOM may consist of one or more nodes; that is, each element (i.e. every HTML element, the content within an HTML element, HTML attributes, and comments) may be considered to be a node. As such, each element is typically ordered in a hierarchical tree structure such that some nodes depend on other nodes. Therefore, if one or more nodes are provided, and a dependency among the one or more nodes exists, any change to one node may be reflected in a fingerprint. As an example, the text "LOG IN TO YOUR ACCOUNT" within content area 236 may be a child node of the content area 232. If a fingerprint is created at step 616, utilizing this node, then any change to the content of this node will be reflected in a changed fingerprint. Moreover, the content of one or more elements may be utilized to create a fingerprint. Accordingly, a fingerprint created utilizing "LOG INTO YOUR ACCOUNT" will be different than a fingerprint created utilizing "LOG INTO YOUR ACCOUNT, WE NOW REQUIRE SS#s".

As another example, the fingerprint creation process may utilize other objects, elements, and/or content located within a web page, resource, and/or document. For example, such objects may include but are not limited to tags, such as HTML tags, headers, iFrames, content, location of content, location of tags, location of objects, one or more scripts, one or more fields, one or more offsets associated with a particular element and/or object from a particular location of another element and/or object. The fingerprint may be created using one or more well known fingerprint creation techniques such as, but not limited, to hashing, concatenation, encryption, or any other fingerprint creation technique that provides an output representative of an input.

Alternatively, or in addition, the objects, elements, and/or content utilized to create the fingerprint may vary overtime and/or may be random. For example, a first fingerprint may be created using a first combination of objects, elements, and/or content of the web page, while a second finger print may be created using a second combination of objects, elements, and/or content of the web page. The first fingerprint may be created for a first user, session, or time, while the second fingerprint may be created for a second user, session, or time. Accordingly, the objects, elements, and/or content used to create a fingerprint may randomly change and/or be randomly identified. Alternatively, or in addition, one or more key, or important, objects, elements, and/or content may be identified such that the fingerprint may always include such importantly identified elements.

As previously discussed, at step 616, a fingerprint is created utilizing the objects elements, and/or content that have been identified. Additionally, at step 616, a client-side executable code, such as script 428, is created. This client-side executable code, or fingerprint script, is created such that when executed at a computer system, such as computer system 108, a fingerprint is created utilizing those same objects, elements, and or content identified in step 612. For example, if a first fingerprint of a website is created by the finger print creation module 516 using a first combination of objects, elements, and/or content of the web page, a client side executable code, such as script 428, is created such that when executed at a computer system 108, a fingerprint of the website, as rendered and/or displayed by the computer system 108, is created using the same first combination of objects, elements, and/or content. Method 600 then passes to step 620 where the fingerprint and the fingerprint script are stored. In some embodiments, the fingerprint may be encrypted prior to being stored. Method 600 then ends at step 624.

Figure 7:
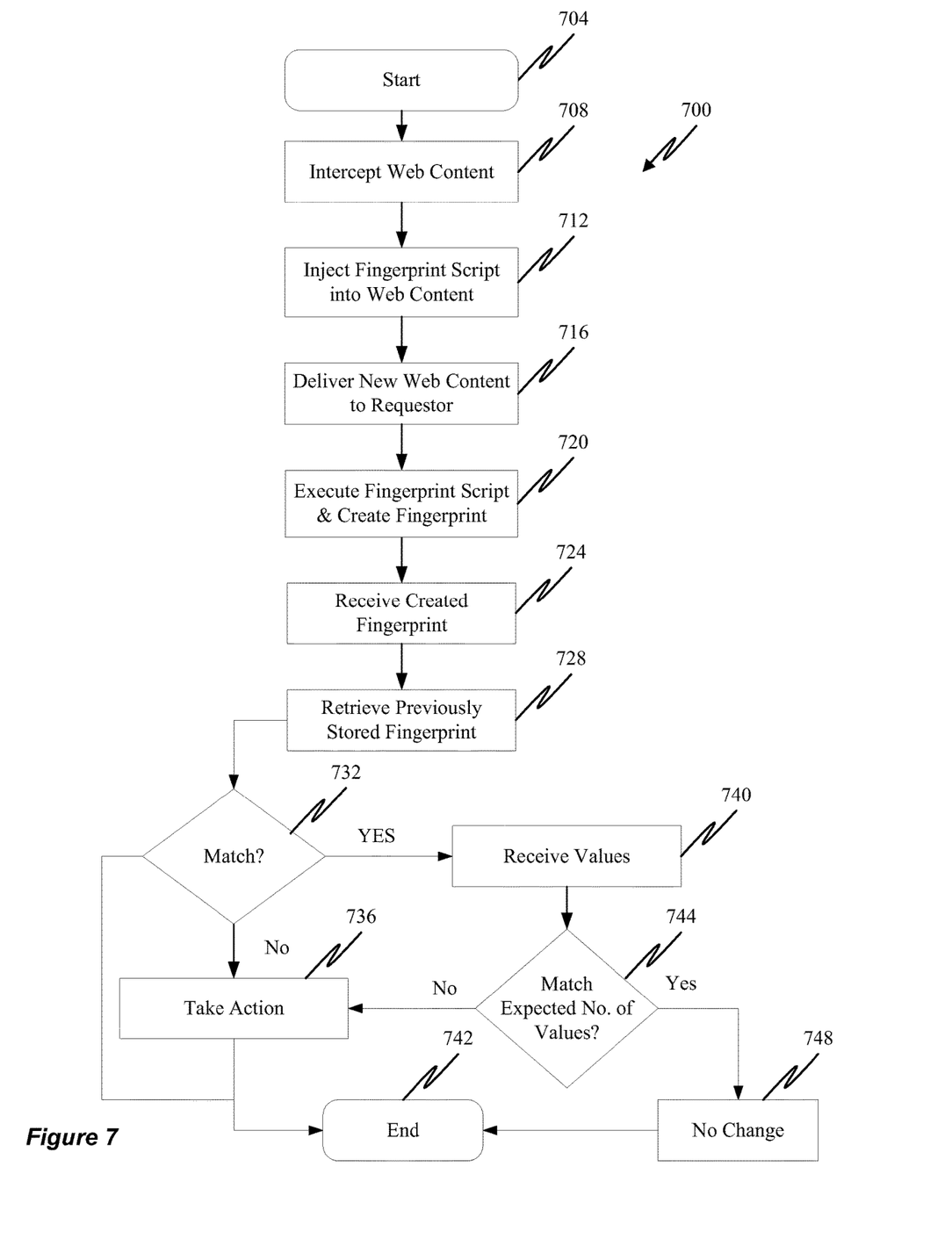
FIG. 7 depicts a flowchart showing the operation of an example method in accordance with embodiments of the present invention.

Referring now to FIG. 7, an exemplary flow diagram depicting the operational method 700 of a protected web page and/or web content in accordance with at least some embodiments of the present disclosure is depicted. In at least some embodiments, method 700 is performed by a device, such as server 104, code injector 408, and/or computer system 108. In at least some embodiments, method 700 is performed by a server 104, code injector 408, and computer system 108. More specifically, one or more hardware or software components, such as code injection module 518, 534, fingerprint comparator module 520, and browser 556 may be involved in performing the method 700. Method 700 may be executed as a set of computer-executable instructions executed by a computer system and encoded or stored on a computer-readable medium. Hereinafter, the method 700 shall be explained with reference to the systems, components, modules, software, data structures, etc. described in conjunction with FIGS. 1-6. More specifically, method 700 shall be explained as if executed by the code injection module 518, 534, fingerprint comparator module 520, and/or browser 556. However, method 700 may be executed by hardware, software, and modules previously described.

Method 700 is initiated at step 704. Method 700 may continuously flow in a loop, flow according to a timed event, or flow according to a change in an operating or status parameter. Once method 700 has started, the code injection module intercepts web content at step 708. More specifically, the code injection module may intercept a web page destined for a specified computer system 108. At step 712, the code injection module may inject or add the client-side script, such as script 428, to the web content destined for the computer system 108. For example, the code injection module may utilize specific rules, modify internet protocol traffic, and/or add a client-side script into the web content, such that the client-side script is executed at a browser 556 of a computer system 108. Next, the method 700 may pass to step 716, where the web content, including the client-side script, is delivered to the requestor, such as the computer system 108. Next, the method 700 may pass to step 720, where the client-side script is executed at the computer system 108. The execution of the client-side script, then produces a fingerprint of the of the web page or web content as displayed or rendered at the computer system 108, for example in the browser 556. Following the execution of the client-side script, the server 104 may receive the fingerprint at step 724. Next at step 728, the server 104 may retrieve the previously stored server-side fingerprint and compare the server-side fingerprint with the client-side fingerprint to determine if they match, such as at step 732. If the two fingerprints match, then there is a high likelihood that the web page displayed to a user at a computer system 108 is the same web page or web content that was sent from the server 104 to the computer system 108 and that malware has not adapted or modified any content. Accordingly, the method 700 may end at 742.

Alternatively, or in addition, the server 104 may receive the arguments that were submitted in fields, such as fields 240, and 244. The server may then perform a check to ensure that the server 104 received the proper number of values, or arguments at step 744. For example, if the server 104 is expecting to receive two values, such as an userid and a password, as shown in FIG. 2, but actually receives three values, such as an userid, password, and social security number, such as at step 744, then the server 104 may take appropriate action to disconnect the user at step 736. Otherwise, if the server-side fingerprint and the client-side fingerprint match at step 732 and the expected number of values matches the received number of values at step 744, the server 104 may determine that there has been no change between the two fingerprints at step 748 and end at step 742.

If, at step 732, the server-side fingerprint, and the client-side fingerprint do not match, then the serve may take action at step 736. Such action may include redirecting a user of a computer system 108 to another website, logging information, such as the internet protocol address, and the values of fields submitted, and/or expressly notifying the user that their computer system 108 may be compromised.

Embodiments of the present invention have been described with particular reference to the examples illustrated. However, it will be appreciated that variations and modifications may be made to the examples described within the scope of the present invention. For example, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for detecting a change in content of a web page, comprising:
identifying a first combination of first and second different types of objects on a web page for protection, wherein the first and second different types of objects are a subset of objects comprising the web page;

creating a first fingerprint based on the first combination of first and second different types of objects;
receiving an instance of the web page, wherein the instance of the web page includes a second combination of objects corresponding to the first combination of first and second different types of objects that are the subset of objects comprising the web page;
injecting executable instructions into the instance of the web page before the web page reaches a user, such that, upon execution, the executable instructions create a second fingerprint based upon the second combination of objects;
receiving the second fingerprint; and
determining whether one or more objects of the second combination of objects have been modified by comparing the second fingerprint to the first fingerprint.

2. The method of claim 1, wherein a modification of the one or more objects of the second combination of objects is detected if the first fingerprint and the second fingerprint do not match.

3. The method of claim 2, further comprising:
providing a second web page when the modification of the one or more objects of the second combination of objects is detected.

4. The method of claim 1, wherein the first fingerprint is based on a combination of two or more objects of the instance of the web page and the second fingerprint is based on the same combination of two or more objects.

5. The method of claim 1, wherein one or more objects of the second combination of objects include at least one of a Document Object Model (DOM) object, an iFrame, a Hyper Text Mark-up Language (HTML) tag, an HTML object, an HTML attribute, and HTML content.

6. The method of claim 1, further comprising:
receiving an indication of a number of values sent from a client, wherein a modification of the one or more objects of the second combination of objects is detected based on the first fingerprint and the second fingerprint not matching and the indication of the number of values sent from the client.

7. The method of claim 1, wherein creating the first fingerprint includes generating a hash value based on the first combination of first and second different types of objects.

8. The method of claim 1, wherein the first combination of first and second different types of objects is a random subset of objects on the web page.

9. A method comprising:
identifying a first combination of first and second different types of objects on a web page for protection, wherein the first and second different types of objects are a subset of objects comprising the web page;
generating a first fingerprint of the web page, wherein the first fingerprint is based on the first combination of first and second different types of objects of the web page;
receiving an instance of the web page, wherein the instance of the web page includes a second combination of objects corresponding to the first combination of first and second different types of objects that are the subset of objects comprising the web page;
injecting executable instructions into the received instance of the web page before the web page reaches a user such that, upon execution at a client device, the executable instructions create a second fingerprint of the instance of the web page based upon the second combination of objects; and
determining whether one or more objects of the second combination of objects have been modified by comparing the first fingerprint to the second fingerprint.

10. The method of claim 9, wherein a modification of the one or more objects of the second combination of objects is detected if the first fingerprint and the second fingerprint do not match.

11. The method of claim 10, further comprising:
providing a second web page when the modification of the one or more objects of the second combination of objects is detected.

12. The method of claim 9, wherein the first fingerprint is based on a combination of two or more objects of the instance of the web page and the second fingerprint is based on the same combination of two or more objects.

13. The method of claim 9, wherein one or more objects of the second combination of objects include at least one of a Document Object Model (DOM) object, an iFrame, a Hyper Text Mark-up Language (HTML) tag, an HTML object, an HTML attribute, and HTML content.

14. The method of claim 9, wherein generating the first fingerprint includes generating a hash value based on the first combination of first and second different types of objects.

15. A system comprising:
at least one processor; and
memory encoding computer executable instructions that, when executed by the at least one processor, perform a method comprising:
identifying a first combination of first and second different types of objects on a web page for protection, wherein the first and second different types of objects are a subset of objects comprising the web page;
generating a first fingerprint of the web page, wherein the first fingerprint is based on the first combination of first and second different objects;
receiving an instance of the web page, wherein the instance of the web page includes a second combination of objects corresponding to the first combination of first and second different types of objects that are the subset of objects comprising the web page;
injecting executable instructions into the received instance of the web page before the web page reaches a user;
receiving a second fingerprint of the instance of the web page based upon the second combination of objects and the executable instructions; and
determining whether one or more objects of the second combination of objects have been modified by comparing the first fingerprint to the second fingerprint.

16. The system of claim 15, wherein a modification of the one or more objects of the second combination of objects is detected if the first fingerprint and the second fingerprint do not match.

17. The system of claim 16, wherein the method further comprises providing a second web page when the modification of the one or more objects of the second combination of objects is detected.

18. The system of claim 15, wherein the first fingerprint is based on a combination of two or more objects of the instance of the web page and the second fingerprint is based on the same combination of two or more objects.

19. The system of claim 15, wherein one or more objects of the second combination of objects include at least one of a Document Object Model (DOM) object, an iFrame, a Hyper Text Mark-up Language (HTML) tag, an HTML object, an HTML attribute, and HTML content.

20. The system of claim 15, wherein the first combination of first and second different types of objects is a subset of objects on the web page.

\* \* \* \* \*